(12) United States Patent
Thompson et al.

(10) Patent No.: US 7,616,559 B2
(45) Date of Patent: Nov. 10, 2009

(54) MULTI-LINK NETWORK ARCHITECTURE, INCLUDING SECURITY, IN SEAMLESS ROAMING COMMUNICATIONS SYSTEMS AND METHODS

(75) Inventors: David Thompson, Austin, TX (US); Lin Shi, Plano, TX (US)

(73) Assignee: Bytemobile, Inc. DE (US)

( * ) Notice: Subject to any disclaimer, the term of this patent is extended or adjusted under 35 U.S.C. 154(b) by 638 days.

(21) Appl. No.: 10/933,067

(22) Filed: Sep. 2, 2004

(65) Prior Publication Data

US 2005/0094556 A1    May 5, 2005

Related U.S. Application Data

(60) Provisional application No. 60/499,648, filed on Sep. 3, 2003.

(51) Int. Cl.
*H04J 3/14* (2006.01)
(52) U.S. Cl. ..................................... 370/223
(58) Field of Classification Search ......... 370/229–235, 370/248, 252–253, 395.5–395.54; 455/436–452.2, 455/432.1–432.2
See application file for complete search history.

(56) References Cited

U.S. PATENT DOCUMENTS

| 5,793,983 | A | 8/1998 | Albert et al. |
| 6,516,352 | B1 | 2/2003 | Booth et al. |
| 2002/0016852 | A1* | 2/2002 | Nishihara .................... 709/236 |
| 2003/0186706 | A1* | 10/2003 | Bergins et al. ........... 455/452.2 |
| 2004/0151136 | A1* | 8/2004 | Gage ........................... 370/328 |
| 2004/0192221 | A1* | 9/2004 | Matsunaga ................... 455/76 |

* cited by examiner

*Primary Examiner*—Thai D Hoang
(74) *Attorney, Agent, or Firm*—The Law Firm of H. Dale Langley, Jr. P.C.

(57) ABSTRACT

A communications system provides for secure communications of information over multiple communications links. The system includes a client device, a server device, and at least one, and typically multiple, available and usable communications channels, elements, modes and links for connecting the devices for communications of information therebetween. The system includes a link detector for determining existence and usability of the communications links for communications of the information, a pathfinder for selecting one or more of the communications links for communications of at least some of the information, a link handover for switching to the selected one or more communications links for communications of the information or portion thereof, and an auto reconnector for re-connecting to detected and selected one or more communications links for communications of the information or portions of it in the event that any communication is hindered, terminated or upset.

7 Claims, 7 Drawing Sheets

WIP Multi-Link and Multi-Server Security Architecture

MULTI-LINK NETWORK ARCHITECTURE, INCLUDING SECURITY, IN SEAMLESS ROAMING COMMUNICATIONS SYSTEMS AND METHODS

CROSS-REFERENCE TO PRIORITY U.S. PROVISIONAL PATENT APPLICATION

The present application is a conversion of, and is related to and incorporates by reference herein, U.S. Provisional Patent Application No. 60/499,648 titled "Multi-link Network Architecture, Including Security, In Seamless Roaming Communications Systems and Methods", filed Sep. 3, 2003 of the same inventors hereof, for which provisional application priority was claimed in the present application in the original filings.

BACKGROUND OF THE INVENTION

The present invention generally relates to networked communications and, more particularly, relates to security implementations for distributed and networked devices operable across individual and concurrent or sequential multiple links or communications channels, such as in environments including mobile or other roaming devices capable of communicating over multiple channels and with channel switching characteristics.

Digital data networks, such as distributed communications networks like the Internet, WANs, LANs, and others, can include various and assorted physical communications links or elements. Communications over the networks are effected via the physical links and their interconnections. For example the links can include wire elements, wireless elements, optical elements, other interconnected communicative media, and combinations and variations of the foregoing.

Each of the communications links can, moreover, serve as or provide one or more communications channels over each physical link. In the case of wired links, for example, the wire can carry signals that are duplexed or otherwise multiplexed, so that the single physical link or connector serves as multiple communications channel links. Likewise, wireless frequency bands can provide differentiated communications channels within the wireless spectrum, and each such band can also be multiplexed in accordance with typical schemes.

Beyond the various types of physical links for data communications, and the differentiation providing multiple bands or channels within each such physical link, multiple types of physical links can (theoretically) be employed in conjunction in network data communications and in each such communication. In such instances, for example, wire links (such as shielded pair) and wireless links (such as cellular transmissions) can be concurrently and simultaneously employed for the data communications in the network. Of course, in such instances, timing, security, data packet sequencing, signal and connection loss on switching, and other coordination and synchrony of the dual physical links, as well as of any multiple bands or channels within each of the links, is critical and problematic.

Moreover, when multiple links, both physical elements and the bands or channels within each such element, are employed for communications in data networks, substantial coordination of communicated information, as well as security of the information, is exponentially complicated. In wireless communications, concurrent or sequential operations can occur over cellular or wireless LAN technologies (such as 802.11 standardized communications). Each of these wireless communications methods experiences substantially greater complexity in timing, security, packet sequencing, data loss, and connectivity, over wired communications conditions.

In cellular wireless communications, for example, mobility of communications devices is typical. Device mobility requires switching among cells for the cellular communications and other concerns unique to the particular wireless environment. In such switching among cells, connections can be dropped, data lost, security constrained, dysfunctional or otherwise impeded or affected, and otherwise. Issues of security of communications, as well as these other issues, are greatly exacerbated in the wireless environment, particularly because the environment involves multiple links and channels of communication, as previously discussed. Together, the challenges to security, and also the remedy of other problems and issues presented in communications involving multiple links and channels, are extensive and complex.

The present invention remedies, resolves and provides solutions for many issues presented in communications over multiple link and multiple channel networks, particularly where the links and channels include wireless and similarly dynamic and interruptible situations and devices, and especially wherein security of communications is important, even when specialized protocols or other implementations are employed for the communications. The present invention, thus, overcomes disadvantages of conventional technology, providing new and improved security and other concepts and designs, and is a significant improvement and advance in the art and technology. Furthermore, the present invention provides security schemes and mechanisms operable even with specialized and non-standard communications protocols, such as UDP or Wireless Internet Protocol (WIP) of the related applications.

BRIEF SUMMARY OF THE INVENTION

An embodiment of the invention is communications system for communicating information. The system includes a client device. The client device includes a client linker. The system also includes a server device, including a server linker. The system also includes at least one communications link communicatively connecting the client device and the server device for communicating the information therebetween and vice versa. The client linker and the server linker each enable appropriate communications of the information over the at least one communications link.

In further embodiments, the client linker includes a link detector for determining existence and usability of the at least one communications link for communications of the information, a pathfinder for selecting a single communications link for communications of the information, from among the at least one communications link, a link handover for switching to the single communications link for communications of the information, and an auto reconnector for re-connecting to the single communications link for communications of the information, if any of the at least one communications link is ever hindered for communications of the information.

In yet another embodiment, the client linker and the server linker includes an implementer of a specialized protocol for communications of the information.

In a further embodiment, the implementer includes a packetizer, a data packet identifier, and a timer. The system further includes a payload maker for formatting the information for communication, and a payload constructor for constructing the information from formatting by the payload maker.

Another embodiment of the invention is a method of communications. The method includes detecting at least one communications link for communications of information between a client device and a server device, determining a select communications link from the at least one communications link, linking to the select communications link to enable communications of information between the client device and the server device, and reconnecting to the select communications link to enable communications of information between the client device and the server device, in any event the step of linking is hindered.

In a further embodiment, the detecting follows the step of reconnecting.

In yet another embodiment, the reconnecting includes detecting, determining, and linking.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
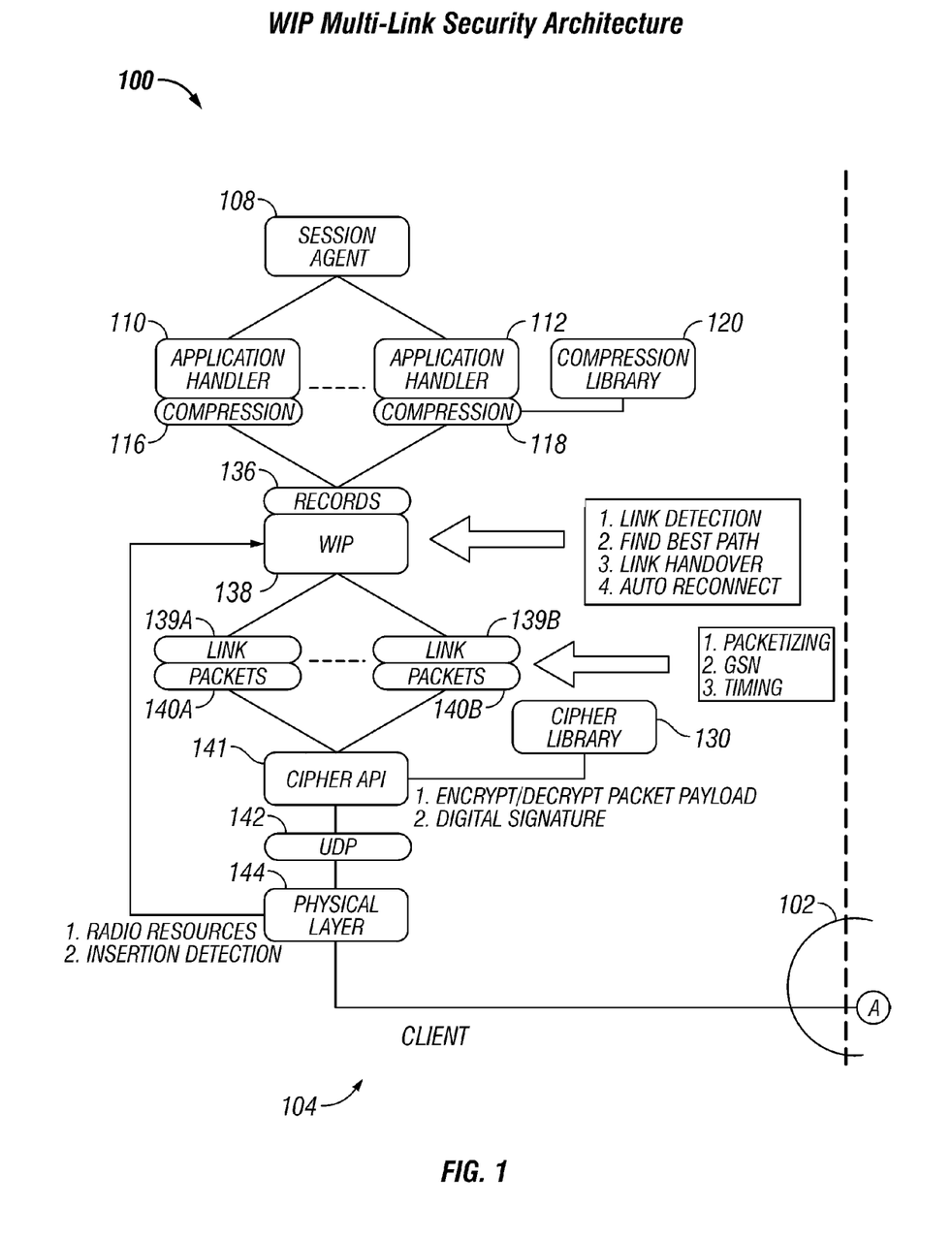
FIG. 1 illustrates a communications system including a client device and a server device connected via a network of multiple link communications modes, elements and channels, wherein the client device and the server device each have architectures and security implementations operable in over the multiple links, according to embodiments of the present invention.

Referring to FIG. 1, a multi-link network architecture, includes security implemented at a transport packet layer in a communications system 100. The system 100 includes a network 102, such as the Internet, wide area network (WAN), local area network (LAN), any other distributed network, or other data communications network. The network 102 can include various mobile or roaming communications devices, as well as various stationary devices, including, without limitation, wide varieties of wireless, wired or otherwise communicatively connected devices and elements.

The network 102 of the system 100, in any event, includes various communicatively interconnected computing and other communications devices, as is typical. The interconnections of the computing and other devices of the network 102 include any of a wide variety of communicative interconnecting elements, channels, and devices ("links"), including wired, wireless, cable, shielded or unshielded pair, fiber, optics, radio frequency, cellular, satellite, and all others. Communications over and across the network 102 between the elements of the network 102 are formatted, and transmitted and received, according to network protocols, such as standardized protocols, like TCP/IP, or specialized protocols, such as the Wireless Internet Protocol (WIP) according to the related applications, or other formatting or protocols.

The system 100 can include multiple links for the communications effected over the network. These multiple links can include multiple physical modes of information passage, including elements such as wires, cellular signals, light waves, optical fibers, switches, routers, software and controls, and all other physical modes and elements. The multiple links can, as well, include multiple channels from multiplexing within each such physical mode or element. Particularly, the system 100 includes architecture that enables and secures communications over the network 102 between roaming, mobile, stationary and all other communications devices, with benefits in switching and transitioning of links or modes of link detection, best path selection, link handover, and auto reconnection. Other novel and improved systems and methods are also presented as herein further detailed.

The network 102 includes, or is incorporated for communications between and with, computing and other communications devices functionally operating as client and server devices or in other communicative relationships. For example, the network 102 includes a client 104 and a server 106. Each of the client 104 and the server 106 are communicatively capable devices operably interconnected for communications via the network 102. The client 104 and the server 106 are each, for example, computing devices with digital packetized data communications capability, for instance, they are computers equipped with modems or other network interface and communication features.

The client 104 includes computing/data processing elements and communicative interface elements. In an exemplary embodiment, the client 104 includes a session agent 108. The session agent 108 is, in effect, any software or hardware of the client 104 that serves to manage aspects of operation of the client 104. Particularly, the session agent 108 manages the concurrent running of the client 104, for example, to handle applications, security, and other operations of the client 104.

The session agent 108 in FIG. 1 connects to and manages a first application handler 110 and a second application handler 112. (Although not shown in detail, but detailed in the related applications and indicated in FIG. 1 as a cipher API and cipher library 130 and hereafter further explained with regard to the system 100, the session agent 108 can also control encryption/decryption or other security measures.) Each of the first and second application handler 110, 112 are any of a variety of applications operable on the client 104, such as e-mail, HTML or other web data retrieval, viewing or manipulation, browsing, ftp (file transfer protocol) operations, or any others. The first and second application handler 110, 112 and this description herein are intended as an example embodiment of the client 104 and its operations, but are not intended to and should not be construed as restrictive, limiting or the only embodiment possible in keeping with the inventions.

Operations of the first and second application handler 110, 112 generate data to be communicated by the client 104, over the network 102, to the server 106. Prior to the client 104 transmitting the data, various other operations on the data to be communicated are possible at the client 104, including, for example, compression of the data. The compression APIs 116, 118 interface with and receive the data from the first and second application handler 110, 112, respectively. The data is compressed, in conjunction with a compression library 120 located at or in communication with the client 104. Through the interactions with the compression APIs 116, 118, the data is formed into records by a records maker 136. The records maker 136 is communicatively connected to or accessible by the compression APIs 116, 118.

The records from the records maker 136 can be communicated according to specialized or non-standard formatting or protocols, in appropriate circumstances, for example, optimized or specialized protocols and formatting can be employed in wireless communications or other physical modes of communications of network data. The related applications describe certain examples of optimized or specialized protocols and formatting particularly for communications of network data via wireless interconnections. In the related applications, the protocols and formats so specialized and optimized for wireless communications of the network data are, for example purposes here, referred to as the Wireless Internet Protocol (WIP). The WIP protocol is a particular specialized wireless protocol for wireless data communications. There are and can be, however, numerous and various other protocols and formats for or used in wireless or other types of network communications. Although WIP is referred to herein for example purposes, it is to be understood that any other varied, specialized, non-specialized, standard or other protocol or format, or combinations thereof, could alternatively be employed in keeping with the embodiments herein, and all such possibilities are included in the description here.

For purposes of the example in which the WIP protocol can be employed in the system 100, a WIP engine 138 is connected to the interface with the records maker 136. The WIP engine formats the records of the record maker 136 according to the WIP protocols. The formatted records can include unique Global Sequence Numbers and WIP headers according to the WIP protocol. Of course, if specialized protocols are not employed, then there is not any WIP engine 138 in the embodiment but there can be some other protocol engine. Alternatively to the WIP engine 138, other or different specialized or standard protocols or formatting can be employed, with substituted protocol engine, features or devices. Examples of alternative formatting and protocol engines and schemes include TCP/IP, UDP, and combinations or variations thereof, as well as any other standard or specialized communications protocols. The circumstances and arrangement of protocols, formats, and communication characteristics will in any event dictate any particular engine or similar design.

In addition to performing protocol and formatting functions, the WIP engine 138 (or any other applicable engine, element or design, as the case may be) functions to detect links available for communications. From the available links for communications, the WIP engine 138 further determines a best one or more of the links for effecting the communications. The WIP engine 138 also functions to permit link handover during switching between or among links, for example, by maintaining desirable switching timing without loss of connection, by assessing and evaluating appropriate switchover situations (e.g., such as movement between cells in a wireless cellular network, and the like), and by logically controlling the interfaces with the link or link at any instant and also the next and prior link or links in any switching of or among links. Finally, the WIP engine 138 performs auto-reconnect functions, in the event that communications are unintentionally severed. For example, auto-reconnection permits reconnection upon overly delayed timing during any handover among links, because of long latencies of communicating device operations, and otherwise in the event of cessation of the communications over the link or links in situations in which next linking is unrecoverable under noisy or otherwise unstable communications link environments or otherwise.

The records from the WIP Engine 138 are next appropriately prepared by a link preparer 139a, 139b. The link preparer 139a, 139b is illustrated in FIG. 1, for example purposes, as separate elements in order to illustrate that any of more than one form of link (i.e., multiple links) can be employed or are employed in each communication instance. In fact, the link preparer 139a, 139b performs specific functions of determining one or more appropriate links of the multiple links. The link preparer 139a, 139b, for example, includes algorithms, tables or other logical criteria for selecting appropriate timing, formats, protocols and the like corresponding to and for the particular pathway link or links at any instant as determined via the WIP engine 138.

Moreover, with regard to WIP or other specialized protocols, a packet formatter 140a, 140b receives data from the link preparer 139a, 139b, respectively. The packet formatter 140a, 140b, like the link preparer 139a, 139b, can be a single functional element; however, for ease of understanding and discussion as regards more than one link of link possibility for communications, the packet formatter 140a, 140b is illustrated in FIG. 1 separately to indicate multiple different links and different operation of the formatter 140a, 140b as necessary for the multiple links. The packet formatter 140a, 140b, in any event, connects to or with the link preparer 139a, 139b. The packet formatter 140a, 140b provides applicable formatting and structures to the data for conformance with WIP or other protocols for the communications, packetization of the data for the particular link or links, sequencing and reconstruction of communicated information such as by Global Sequence Numbers or other schemes, and timing control or regulation for the particular link or links for the communications.

A security component, such as a cipher API 141, connects to or with the packet formatter 140a, 140b. The cipher API 141 receives packetized data for the communications from the packet formatter 140a, 140b. The security component, such as the cipher API 141, also connects to a cipher library 130. The security component, such as comprising the cipher API 141 and the cipher library 130, is any of a variety of security applications operable on the client 104, such as a firewall application, an encryption scheme, or any others or combination. Any number and kind of such applications and security applications can be operable on the client 104, according to the client 104 and its particularities. In any event, the security component, for example, the cipher API 141 and the cipher library 130, interacts with and serves to encrypt/decrypt packets and payloads of packets, provide and handle digital signatures, keys and so forth as applicable.

The secured data packets and payloads from the cipher API 141 are next passed to interconnected communicative interface elements of the client 104. The communicative interface elements include software and hardware of the client 104 that serve to packetize, format, supply headers, and physically communicate data via the network 102 in accordance with appropriate protocols and formats for the network 102. For example the communicative elements can include a Uniform Data Protocol (UDP) or other standard or network specific formatting and preparation network protocol implementer 142.

The network protocol implementer 142 is connected to a physical layer 144. The physical layer 144 is a modem, network card, or other physical connector for communicatively connecting the client 104 with the network 102. In embodiments employing the WIP engine 138 of the related applications, a feedback signal from the physical layer 144 connects the physical layer 144 to the WIP engine 138. This feedback signal provides data, information and variables employed by the WIP engine 138 in logical determinations applicable to control and guidance of communications for the particular links and network conditions.

The foregoing discussion of the client 104 describes primarily transmission features of the client 104. Reception features of the client 104 are substantially similar, but proceed in counter-order. Particularly, received information from the network 102 at the physical layer 144 of the client 104, proceeds sequentially to the network protocol implementer 142, the packet formatter 140, the cipher API 141 for decoding or other appropriate manipulation in conjunction with the cipher library 130, the WIP engine 138, and the records preparer 136. The records preparer 136 connects and transfers the information to the compression APIs 116, 118, for decompression and manipulation as appropriate for the information in conjunction with operation of the compression library 120. The decompressed information from the compression APIs 116, 118, as the case may be, is delivered to and can be employed by any application handler 110, 112, and otherwise by the client 104.

Continuing to refer to FIG. 1 and more particularly regarding the server 106, the server 106 can be one or more communication devices (for example, a single computer or or a multi-setup, such as a server bank or farm), operating with a server functionality in a client-server relationship with the client 104. The server 106 can include conventional server features, for example, a login server, a session controller, and others. The login server 160 operates to communicate with a permitted user directory (not shown in detail), such as an associated database and password security implementation procedure. The login server 160 permits logging, look-up and accessibility operations by authorized ones of the client 104, over the network 102, in communications between the client 104 and the server 106.

The server includes a session manager 166. The session manager 166 controls communications sessions between the client 104 and the server 106, including interconnection to and management of functions of a first application handler 170 and a second application handler 172. Each application handler 170, 172 is connected to and operates in conjunction with compression and decompression operations of a compression device 178, 180 and the associated and communicably connected compression library 174. It is notable that there is substantial symmetry in the operational functions of the client 104 and the server 106, in that each includes functional capabilities for managing applications operations and also secure communications operations. The 106 server includes or can be operably and communicatively associated with a security server or other similar elements for providing secure communications functions and the like.

Each of the first and second application handlers 170, 172 includes various functional elements, such as, for example, respective connections to compression APIs 178, 180. As with the client 104, the application handlers 170, 172 can be any of a variety of programs or applications operable on or in conjunction with the server 106. Although only the two application handlers 170, 172 are illustrated in the FIG. 1, it is to be understood that any of a variety of applications can be concurrently or otherwise operating on and in regards to the server 106, with similar function of generating or making available data or information for communication. The compression APIs 178, 180 connected to the application handlers 170, 172 compress and decompress, as applicable, information from or to the handlers 170, 172. The compression APIs 178, 180 are connected to the compression library 174 for operations.

A records maker 190 connects to the compression APIs 178, 180. The records maker 190 forms records of compressed data provided from the compression APIs 178, 180 that interface therewith.

A protocol engine, such as a WIP engine 192 for example purposes, also connects to the records maker 190. The records from the records maker 190 are formatted and manipulated by the WIP engine 192. Moreover, the WIP engine 192 of the server 106, as in the client 104, performs similar functions of link detection, finding a best link path or paths, link handover, and auto-reconnection.

The WIP engine 192 is connected to one or more of a link implementer 193a, 193b. As with the client 104, the link implementer 193a, 193b can be a single or multiple elements, although illustrated in FIG. 1 as more than one element for purposes of discussion and understanding that multiple links can be available and/or used for communications in any instance depending on circumstances of the server connection and connectability to the network 102. The link implementer 193a, 193b is connected to a packetizer 194a, 194b. The packetizer 194a, 194b can also be a single or multiple elements, but is illustrated in FIG. 1 for understanding that the packetizer 194a, 194b also functions according to multiplicity of links for communications.

A cipher API 195 connects to the packetizer 194a, 194b. The cipher API 195, in conjunction with an interconnected cipher library 176, encrypts and decrypts information to be transmitted and received, respectively, by the server 106 from the network 102.

In any case, the data or information for communication is similarly made available in compressed records, with cryptologic characteristics or properties, for handling by communicative elements operable at or with the server 106 in communications of the data or information over the network 102.

The communication elements of the server 106 include a protocol implementer 196 connected to the cipher API 195. The protocol implementer 196 formats and prepares packetized records for communication according to standard or other communications protocols for the particular network 102, such as, for example, the protocol implementer 196 formats for standardized User Datagram Protocol (UDP) or other protocols, by the server 106. A physical layer 198, such as a modem, a network card, or other communications interface, is connected to the protocol implementer 196 and performs transmissions, and also receptions, over the network 102, of the particularly formatted and packetized data information.

The foregoing discussion of the server 106 describes primarily transmission features of the server 106. Reception features of the server 106 are substantially similar, but proceed in counter-order and predominantly reverse-function. Information is initially received by the server 106 at the physical layer 198. The physical layer 198 passes the information sequentially to the protocol implementer 196, the cipher API 195 in conjunction with the cipher library 176, the packetizer 194a, 194b, the link implementer 193a, 193b, the WIP engine 192, and the records preparer 190. The records preparer 190 connects and transfers the information to respective compression APIs 178, 180, or as otherwise appropriate for the information, in order to decompress the information. The cipher APIs 178, 180 decompress the information in conjunction with the compression library 174. The compression APIs 178, 180 deliver the decrypted and decompressed information to applications of the server, such as those of the application handlers 170, 172 or others. The information can then be employed by the server 106 in applications, further communications, or otherwise.

In the foregoing, the client 104 and the server 106 are addressed and described as though each is an independent communicative element for communications via the network 102. The client 104 and the server 106 are, in fact, however, functionalities that any communicative element of the network 102 can provide or perform. For example, a processing device, such as a computer, that is communicatively connected to the network 102 can function and perform the operations of the client 104 and the server 106, as applicable according to the communications being conducted. In such instance, the processing device acting as the client 104 can make requests over the network 102 to another device that is acting as the server 106. This other device acting as the server 106 can then respond over the network 102 or otherwise, to the processing device acting as the client 104 in applicable manner. Under this scenario, the client 104 and the server 106 are particular functionalities of the respective devices. In continuing communications over the network 102, however, the processing device can act instead as the server 106, receiving requests from the other device (or any other device, for that matter) acting as the client 104. Although the physical processing device is not changed, its operation is changed from time to time during communications to act either as the client 104 or the server 106, depending upon the state and type of communications.

In these respects, it is noteworthy that the client 104 and the server 106, whatever the physical devices may be, operate similarly and with parallel functionalities as described above, in order to enable and permit communications over multiple links of the network 102. Typically, the server 106 may be thought of as a centrally operated node or element of the network 102 that receives requests and responds accordingly to the requestor; and the client 104 may be thought of as a remotely operated node or element of the network 102 that makes requests and receives from the requestee applicable responses. These particular functionalities, however, are independent of any particular type or location of devices communicably connected to the network 102, and certain devices so connected can serve either or both functions, as well as others. In any instance, the architecture for multiple link communications and the corresponding security implementation, together with the parallelism in both client and server functioning, is present in the embodiments.

Figure 2:
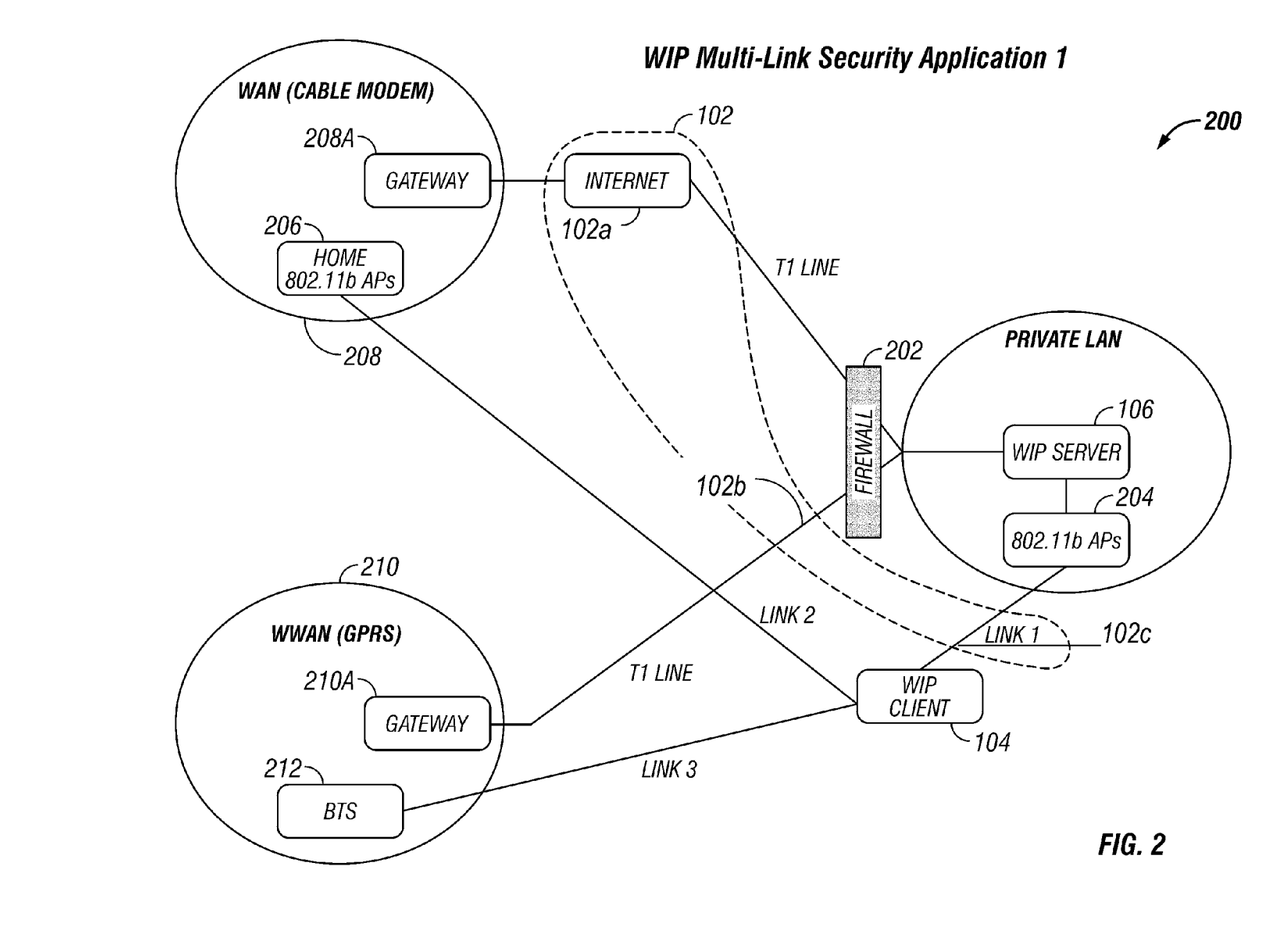
FIG. 2 illustrates an the communications system of FIG. 1, including a firewall for security of the server device in the multiple link environment, according to embodiments of the present invention.

Referring to FIG. 2, a firewall 202 is deployed in a system 200 like that of FIG. 1 but including the firewall 202. The illustration in FIG. 2 is intended as an operational and functional conceptualization, employing the client 104 and server 106 in communications over the network 102 in the system 100 of FIG. 1. In FIG. 2, a client 104, for example, a client device operating in accordance with the WIP protocols, is communicating with a server 106, such as a server device also operating in accordance with the WIP protocols. The client 104 is communicating, either concurrently, sequentially or individually, as the case may be, with the server 106, over any one or more possible links: Link 1, Link 2, and/or Link 3. These links are merely intended as examples of multiple links that are possible in keeping with the architecture and security limitations of the embodiments of FIG. 1. Nonetheless, the three links—Link 1, Link 2, and Link 3—provide understanding of the operations of the system 100 of FIG. 1 in a multiple link environment.

In FIG. 2, Link 1 is shown as a single mode link 102c between the client 104 and the server 106 passing around, and not through, the firewall. Such an arrangement is, for example, typical of a virtual private network (VPN) or other secure communications arrangement between the client 104 and the server 106. With respect to Link 1, the client 104 communicates with the server 106 via wireless connection, such as through a wireless access point 204 connected by wire to the server 204 at a port of the server 204 and connected via radio waves to the client 104 through a physical wireless modem or other feature of the client 104. In the example of Link 1, the wireless communications, and respective communications features of the client 104 and the server 106, operate according to a standardized communications scheme, such as the 802.11b standard. Communications between the client 104 and the server 106 are effected over the network 102 via the link 102c. Of course, as those skilled in the art will know and appreciate, any other single mode link 102c is similarly enabled, for example, a direct wired link, an infrared link, a cellular link, a microwave link, or other communicative link, between the client 104 and the server 106.

Continuing to refer to FIG. 2, Link 2 is a dual mode link through the Internet 102a between the client 104 and the server 106. In the link 102a, for example, the client 104 communicates wirelessly according to a localized wireless link (such as under the 802.11b standard or otherwise). A wireless access point 206 communicates with compatible wireless modem elements of the client 104. The wireless access point 206 is connected to a modem 208, for example, a cable modem or other wide area or Internet access element. The modem 208 includes or provides a gateway 208a to the network 102. In the particular example of FIG. 2, the gateway 208a connects to the Internet 102a of the network 102. The network 102 communicates to and across the firewall 202. Communications pass across and through the firewall 202 to and from the server 106.

Still referring to FIG. 2, Link 3 includes as an example a wireless wide area network 210. This wireless wide area network (WWAN) 210 communicates with the client 104 over wireless channels, such as cellular data packet or other channels as exemplified by the base transceiver station (BTS) 212. With the WWAN 210, the BTS 212 communicates with a gateway 210a of the WWAN 210. The gateway 210a communicatively connects to the server 106, across and through the firewall 202, via the wireless link 102b of the network 102. As with all of the Link 1, Link 2 and Link 3, various wired, wireless or other physical communicative links and modes can be interconnected forming the links 102a, 102b, and 102c, as is conventional. In any event, communications over the links 102a, 102b, and 102c, because of the architectures and security of the embodiments of the system 100 of FIG. 1, are compatible with particular standard or other protocols of the network 102, generally.

In operation of the exemplary configuration in FIG. 2, communications over the network 102 (whether via the Internet 102a, the wired link 102b, or the wireless link 102c) conform to protocols and formats for communications typical for the network 102, including any specialized protocols and formats such as the WIP protocols. For example, these protocols and formats can be WIP, TCP/IP, UDP, or similar network protocols or variations of them. The firewall 202, in such example, can be any standard or other firewall 202 that is designed to enable and permit passage therethrough of the particular protocols and communications of the network 102. Any specialized WIP protocols or other special features employed, such as for optimization of communications speeds, timing, and so forth, are handled, including receivable/readable and transmittable, appropriately at the client 104 and the server 106, each having architectures and operations as described above in connection with FIG. 1.

Figure 3:
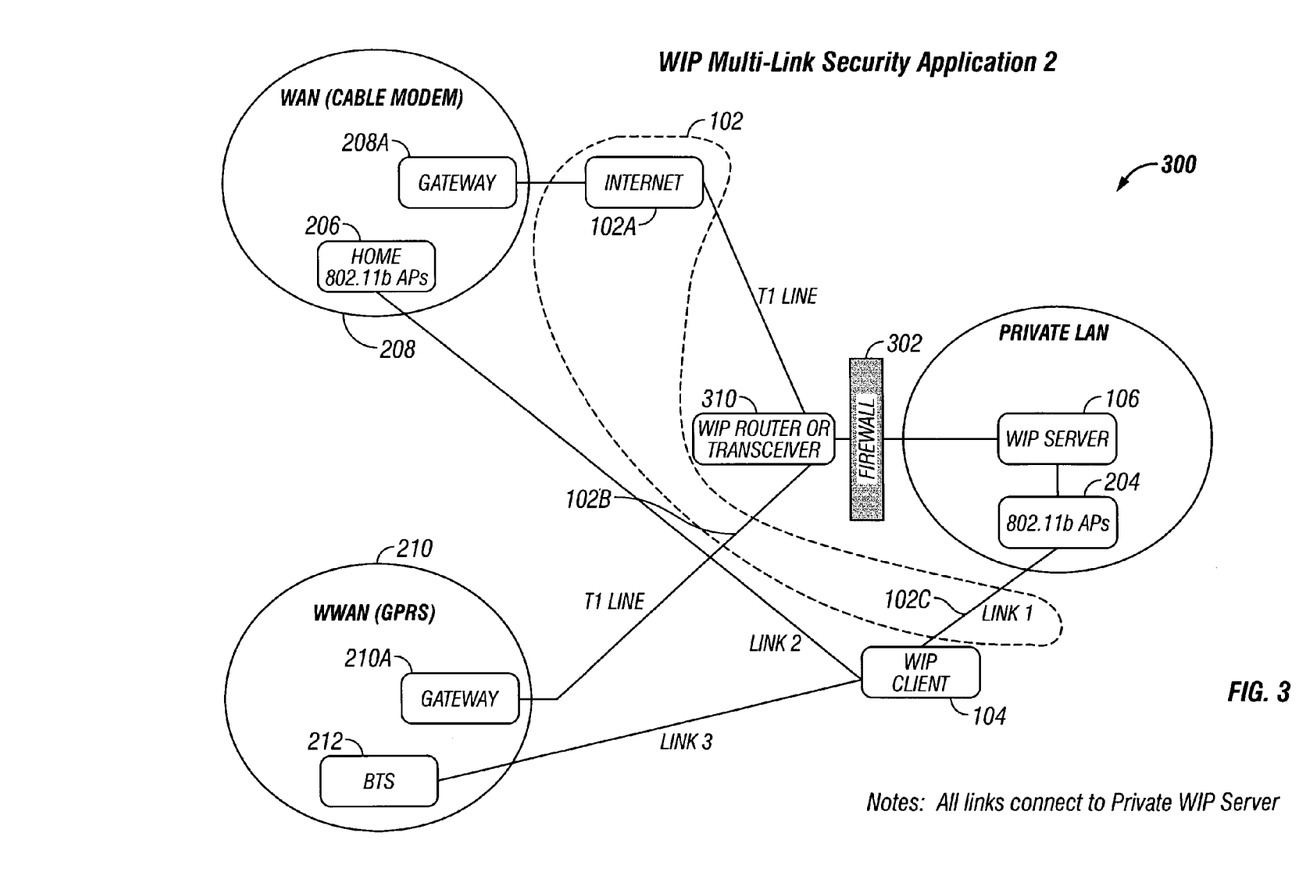
FIG. 3 illustrates an alternative communications system substantially according to FIG. 2, but including a specialized protocol transceiver outside the firewall, to enable proper firewall operations according to standard or other non-specialized network protocols, in the multiple link environment, according to embodiments of the present invention.

Referring to FIG. 3, an alternatively arranged system 300, according to the architectures and security embodiments of FIG. 1, includes a firewall 302. In the system 300, the firewall 302 is located adjacent (i.e., "outside" the server 106). Adjacent the firewall 302 (i.e., "outside" the firewall 302) is located an added element of a specialized router or transceiver 310. The transceiver 310 connects to the network 102, between the network 102 and the firewall 302. The transceiver converts communications according to specialized protocols, such as, for example, WIP protocols and formats, to standard or other network-enabled protocols. In operation, the standard or other network protocols of communications over the network 102 are translated to the specialized WIP or other similar protocols. In the embodiment, communications received at the transceiver 310 are translated to protocols passable through the firewall 302 and useable by the server 106. Communications from the server 106 passing through the firewall 302 are received and translated by the transceiver 301, then the communications are passed to and over the network 102 according to the standardized or other network-enabled protocols of the network 102.

Figure 4:
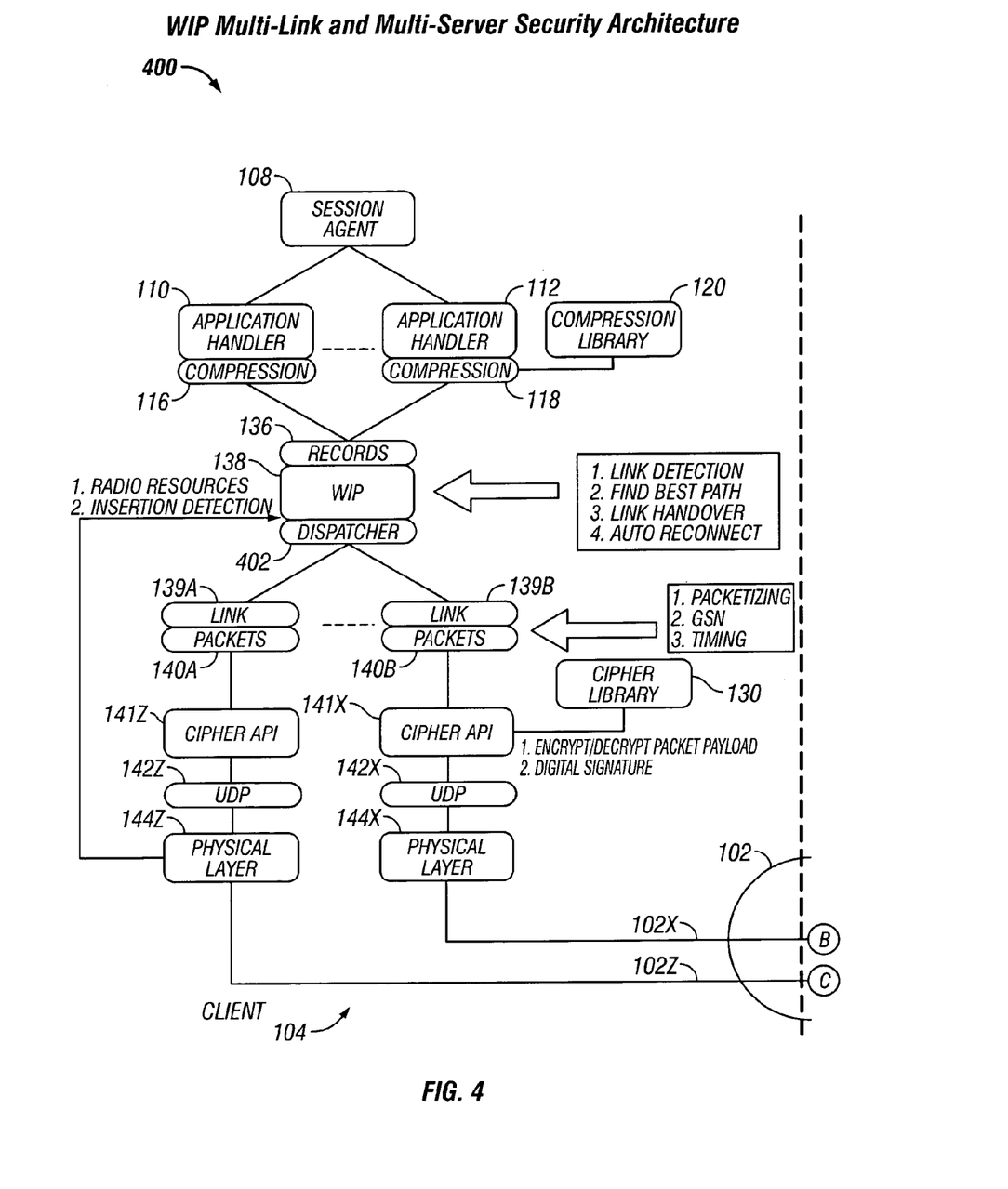
FIG. 4 illustrates a multiple server communications system, in which the multiple servers are each capable of independent operation in communications with a client device, over multiple link communications modes, elements and channels of a network of the system, according to embodiments of the present invention.

Referring to FIG. 4, a typical multiple server system 400, including (for illustrative and exemplary purposes) a server 106x and a server 106z, conforms to the architectures and securities of the system 100 of FIG. 1. In the system 400, by reference to FIG. 4 in conjunction with reference to FIG. 1, the client 104 includes substantially the same elements of the client 104 of FIG. 1, except that multiple server connections 102x, 102z each separately connect via the network 102 the client 104 to the respective servers 106x, 106z.

Of course, each of the servers 106x, 106z in the system 400 includes respective protocol implementers 196x, 196z, and respective physical layers 198x, 198z. The client 104 in the system 400 must include elements and functionalities to selectively communicate with the respective servers 106x, 106z over the respective network connections 102x, 102z. The client 104, therefore, includes a dispatcher 402. The dispatcher 402 connects to the protocol engine, such as the WIP engine 138, and controls dispatch of data from the engine to the appropriate connection 102x or 102z and corresponding respective server 106x or 106z. As with the client 104, multiple links for communications are enabled by manipulation, formatting, and encryption/decryption of data via the link implementers 139a, 139b, the packetizers 140a, 140b, and the cipher APIs 141x, 141z. The cipher APIs 141x, 141z will, of course, be either the same or different based on the requirements for communications with the applicable server 106x or 106z. The various and multiple links and modes for links illustrated by the implementers 139a, 139b, packetizers 140a, 140b, can of course be any single or multiple possibility, according to the available physical modes and client features. The network protocol implementers 142x, 142z and the physical layers 144x, 144z can either be the same or different, depending upon the particular links involved and the particular requirements for the communications with the respective servers 106x, 106z over the respective network links 102x, 102z. In every event, similar concepts of architectures and securities described herein and with respect to FIG. 1, are employed in the system 400 in multiple link environments for the communications with the multiple servers 106x, 106z.

Figure 5:
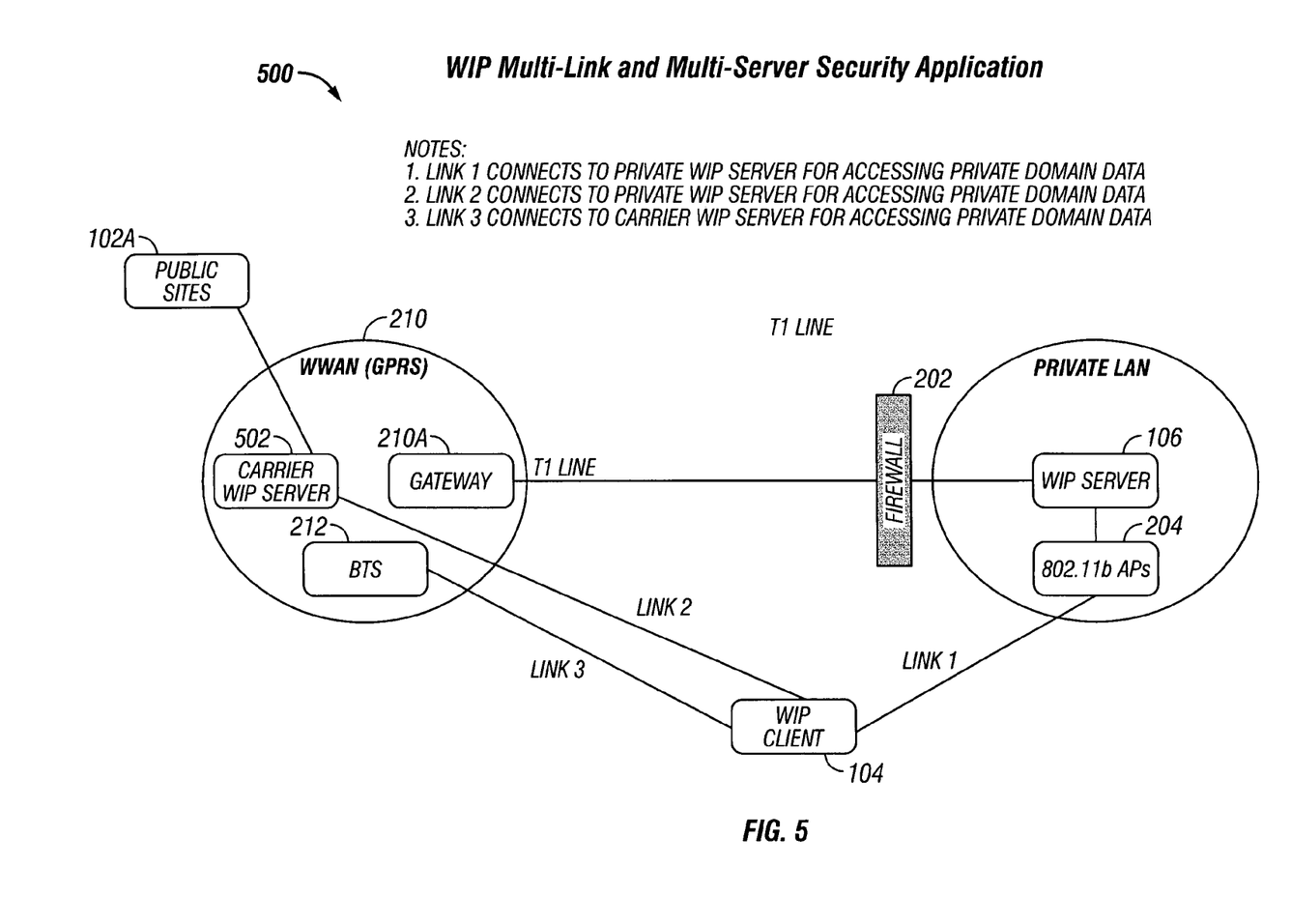
FIG. 5 illustrates a multiple server, multiple link communications system, including a client device and multiple servers, with communications and communications links comprising access and elements to and in private domain, public domain, and combinations thereof, according to embodiments of the present invention.

Referring to FIG. 5, a system 500 illustrates a multiple server, multiple communications link embodiment, for providing private domain and public domain access by the client 104. The WIP server 106 is connected behind the firewall 202, with relation to the public network 102. The client 104 communicates wirelessly (i.e., Link 1, in the example) with the WIP server 106, such as via the access point 204, in the private domain of the WIP server 106 connected behind the firewall 202. The client 104 also, or alternatively, as the case may be at any instant of communications, communicates wirelessly, by wire, or other physical mode, channel and/or link (i.e., Link 3, in the example), in the public domain, such as over the Internet 102a or other public domain access network. The client also or alternatively, as the case may be, communicates by any such mode, channel and/or link (i.e., Link 2, in the example), in the public domain and through the firewall 202 also in the private domain of the WIP server 106.

In the system 500, a public ("carrier") WIP server 502 is not protected behind any firewall or other extraneous security, and merely permits communications through the public domains via the Link 3 between the client 104 and the carrier WIP server 502. The carrier WIP server 502 is included the system 500 solely to show and illustrate that specialized protocols, including specialized communication servers and elements therefore, can be accessible through public domains. This is an appropriate embodiment, for example, where the specialized protocols or communications modes or vehicles of the system 500 can optimize or otherwise beneficially enable communications over any particular physical communications mode or links. In the case of the WIP protocol and carrier WIP server 502, the related applications describe the advantages in wireless and other dynamic communications links and environments of the features of the WIP protocol. Any other specialized or desired protocols can be enabled for communications by and with the client 104, in similar manner.

The part public, part private domain communications exemplified in the system 500 via the Link 2, shows an embodiment for communications over multiple links which have public domain and private domain access and passage. Particularly, the client 104 communicates via the Link 2, a public domain communication, with the WWAN 210 according to FIG. 2, and the WWAN 210 then communicates through the firewall 202 as private domain communication to the server 106. In similar manner, any combination of public and private domain communications links can sequentially, concurrently or otherwise permit and enable communications across the firewall 202 or any similar security scheme or arrangement.

In operation of the foregoing systems and methods, alternative business and technical arrangements are possible. For example, any network or portion or sub-part of any network could be an intranet, or even an intranet combination or intranet-extranet combination, including public and private domain links and communications. Numerous client and server devices can be simultaneously intercommunicating, as is typical over the Internet and other distributed networks. The network can include any number and type of communicative elements and interconnections. Moreover, multiples of client devices and server devices can be possible for receiving communications from pluralities of other corresponding devices, and these devices and any of them can be centrally located or distributed, including virtually or actually mobile, through a wide geographic area. In the case of a global network such as the Internet, the network is capable of generally communicating by its protocols, which may include other specialized protocols (such as the WIP protocol or other) for specific situations, notwithstanding that specialized protocols can be employed for client-server communications in particular in the wireless channels.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A communications system for communicating an information, comprising:
    a client device, including a client linker;
    a server device, including a server linker;
    a first communications link for communicatively connecting the client device and the server device for communicating the information therebetween;
    a first security feature of the first communications link;
    a second communications link for communicatively connecting the client device and the server device for communicating the information therebetween;
    a second security feature of the second communications link;
    wherein the first communications link differs from the second communications link;
    wherein the client linker selects either of the first communications link and the second communications link for communications by the client device with the server device and the server linker selects either of the first communications link and the second communications link for communications by the server device with the client device; and
    wherein the client linker and the server linker maintain continuous communications of the information between the client device and the server device over: (i) the first communications link if the second communications link is unable to communicate the information; and (ii) the second communications link if the first communications link is unable to communicate the information.

2. The communications system of claim 1, wherein the client linker comprises:
    a link detector for determining existence and usability of the first link and the second link for communications of the information;
    a pathfinder for selecting either of the first link and the second link at each instant, for communications between the client device and the server device;
    a link handover for switching to the first link from communication over the second link, and to the second link, from communication over the first link; and
    an auto reconnector for re-connecting communications between the client device and the server device via the first link, if the second link is unable to communicate the information, and via the second link, if the first link is unable to communicate the information.

3. The communications system of claim 2, wherein the client linker and the server linker comprise an implementer of a specialized protocol for communications of the information.

4. The communications system of claim 3, wherein the implementer comprises a packetizer, a data packet identifier, and a timer; and further comprising:
    a payload maker for formatting the information for communication; and
    a payload constructor for constructing the information from formatting by the payload maker.

5. A method of communications, comprising:
    detecting a first communications link having first security, for communications of information between a client device and a server device;
    detecting a second communications link having second security, for communications of information between the client device and the server device;
    selecting the first communications link, having first security, for communicating between the client device and the server device if available;
    if the first communications link is not available, selecting the second communications link, having second security, for communicating between the client device and the server device;
    linking to one of either the first communications link and the second communications link at each instant, to maintain communicative connectivity during communications between the client device and the server device;
    reconnecting to the first communications link for communicating information between the client device and the server device, if communications are hindered over the second communications link; and
    reconnecting to the second communications link for communicating information between the client device and the server device, if communications are hindered over the first communications link.

6. The method of claim 5, wherein the step of selecting the second communications link follows the step of selecting the first communications link.

7. The system of claim 1, wherein the first communications link comprises a plurality of packet-switched communications paths, having the first security feature, and the step of selecting the first communications link comprises the step of selecting at least one of the plurality of paths for communications between the client device and the server device over the first communications link; and
    wherein the second communications link comprises a plurality of packet-switched communications paths, having the second security feature, and the step of selecting the second communications link comprises the step of selecting at least one of the plurality of paths for communications between the client device and the server device over the second communications link.

* * * * *